Dec. 18, 1934.  E. M. HOLM  1,984,644
FISHING POLE
Filed June 13, 1934
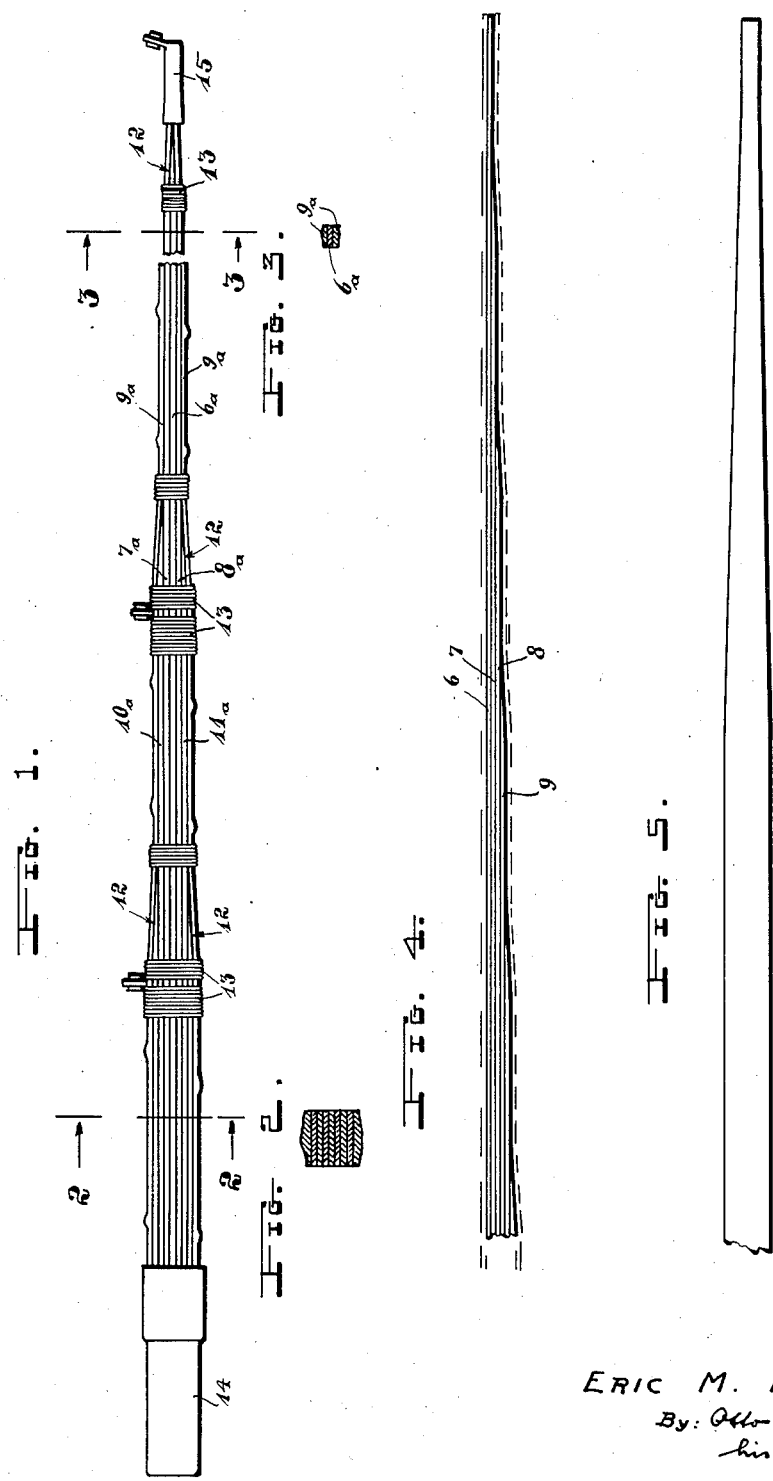
INVENTOR:
ERIC M. HOLM,
By: Otto H. Ruger,
his Atty.

UNITED STATES PATENT OFFICE 1,984,644

FISHING POLE

Eric M. Holm, Los Angeles, Calif.

Application June 13, 1934, Serial No. 730,443

3 Claims. (Cl. 43—18)

This invention relates to devices used by individuals for handling fishing tackle, such as line and hooks.

One of the objects of this invention is to provide a fishing rod with as much strength and flexibility as possible.

Another object is to construct a fishing rod of flat longitudinally disposed laminations.

Another object is to construct a fishing rod in the manner of a laminated spring.

Another object is to construct such laminations of bamboo material.

Other objects will appear from the following description and appended claims as well as from the accompanying drawing, in which—

Fig. 1 is a side elevation of a fishing rod designed according to this invention.

Fig. 2 is a cross section on line 2—2 of Fig. 1.

Fig. 3 is a cross section on line 3—3 of Fig. 1.

Fig. 4 is a somewhat schematic illustration of an arrangement of leaves of bamboo material arranged in the manner of a laminated spring without the extra or outer leaves indicated in Fig. 1.

Fig. 5 is a top view, showing the tapered shape of the individual leaves.

As illustrated in Figs. 1 and 4, the principal feature of this invention embraces an arrangement of a number of leaves 6, 7, 8, and 9; or $6_a$, $7_a$, $8_a$, and $9_a$; the arrangement in Fig. 4 being exactly according to a regular laminated-spring construction, while the arrangement in Fig. 1 shows the full leaf in the center and other leaves on opposite sides short of one another, to provide for various thicknesses of the finished rod.

The intermediate leaves, such as $6_a$, $7_a$, $8_a$, $10_a$, and $11_a$, are preferably tapered, as clearly indicated at 12, so that the finished rod as illustrated in Fig. 1 presents an evenly tapered appearance wherever a change of thickness is provided.

Moreover, the individual leaves are also tapered as clearly illustrated in Fig. 5, so as to assure a very desirable flexibility in the completed rod.

Though the slightly modified form illustrated in Fig. 4 merely shows the laminated spring construction, it must be understood that in the finished rod this also is provided with outer leaves, such as $9_a$ in Fig. 1, whereby the shorter leaves are embodied firmly in the whole device as a fishing rod.

The individual leaves of this fishing rod are preferably made of strips of bamboo, the outer such as $9_a$ being merely flattened and smoothened on one side, while all other or intermediate leaves are flattened and smoothened on opposite sides, besides being tapered at the ends and edgewise as set forth above.

Nevertheless, the outer leaves receive also a finishing according to the grade of work with respect to costs as also with respect to the taste of the different individuals in the trade, though spots at various points in the finished surface, showing the darker appearance of the untouched or less attacked parts of the outer surface of any bamboo, give the finished rod a desired attraction, since, when such a finishing is done, of course, material is not shaved off in an even thickness but rather so as to leave nearly an even thickness, to result in such spots of the original outer surface being left in the finished surface.

A fishing rod embracing the laminated spring construction of Fig. 4 and being tapered according to the illustration of Fig. 5, resulting in a greater thickness near the handle-portion of the finished fishing rod and a smaller thickness near the free end, assures a flexibility the same as or even better than that which may be expected of the customary normally-tapered fishing rods.

Larger, stronger, and longer fishing rods, of course, as a rule, have more leaves than smaller rods, but even small rods may have more or less laminations, depending on the desired flexibility. More but thinner laminations may result in a fishing rod no thicker, or even thinner, than, a rod made up of thicker laminations though fewer.

Though the several laminations may be held together by tie-windings such as indicated at 13, or the rear-ferrule indicated at 14, or the front-end ferrule indicated at 15 in Fig. 1, it has been found that casein serves well as an adhesive between the layers or laminations under any weather conditions to which fishing rods are generally subjected.

Having thus described my invention, I claim:—

1. In a fishing rod, an arrangement of bamboo leaves in the form of a laminated spring construction, one leaf short of another, the ends of the leaves being tapered on the flat side to bring adjoining leaves into an evenly tapered form, and the several leaves being secured together.

2. In a fishing rod, an arrangement of bamboo leaves in the manner of a laminated spring construction, one leaf being short of another, the ends of the leaves being tapered on the flat sides to bring adjoining leaves into an evenly tapered form, and the several leaves being tapered edgewise and secured together.

3. In a fishing rod, an arrangement of bamboo leaves in the form of a laminated spring construction, one leaf being short of another, the ends of the leaves being tapered on the flat sides to bring adjoining leaves into an evenly tapered form, outer leaves being placed over the flat sides of the laminated spring construction arrangement, and the whole being tapered edgewise and secured together.

ERIC M. HOLM.